(12) United States Patent
Cook et al.

(10) Patent No.: US 8,194,292 B2
(45) Date of Patent: Jun. 5, 2012

(54) IMAGING APPARATUS HAVING AN LCD DOCUMENT GLASS

(75) Inventors: Brian Dale Cook, Nicholasville, KY (US); Brian Keith Owens, Lexington, KY (US); Michael R. Wedding, Lexington, KY (US); John Thomas Writt, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 979 days.

(21) Appl. No.: 12/006,189

(22) Filed: Dec. 31, 2007

(65) Prior Publication Data

US 2009/0168118 A1    Jul. 2, 2009

(51) Int. Cl.
*H04N 1/04* (2006.01)
(52) U.S. Cl. ......... 358/474; 358/408; 358/475; 358/496
(58) Field of Classification Search .................. 358/474, 358/408, 475, 496, 497, 498, 505
See application file for complete search history.

(56) References Cited

U.S. PATENT DOCUMENTS

| 5,875,269 A * | 2/1999 | Yamashita et al. ............. 382/312 |
| 7,609,418 B2 * | 10/2009 | Takahashi ..................... 358/408 |
| 2004/0090529 A1 | 5/2004 | Takahashi |
| 2004/0212823 A1 | 10/2004 | Chavers et al. |
| 2005/0012953 A1 | 1/2005 | Fujishige et al. |
| 2007/0047781 A1 | 3/2007 | Hull et al. |
| 2009/0168124 A1 | 7/2009 | Edwards et al. |
| 2009/0251739 A1 | 10/2009 | Cook et al. |

FOREIGN PATENT DOCUMENTS

| JP | 61-130944 | 6/1986 |
| JP | 07-084233 | 3/1995 |
| JP | 07-184006 | 7/1995 |
| JP | 11-215312 | 8/1999 |
| JP | 2007-215139 | 8/2007 |

OTHER PUBLICATIONS

Final Office Action for U.S. Appl. No. 12/006,202, dated Jan. 4, 2012.
Notice of Allowance for U.S. Appl. No. 12/006,202, dated Apr. 12, 2012.

* cited by examiner

*Primary Examiner* — Houshang Safaipour (57) ABSTRACT

An imaging apparatus includes an image capturing system, and a controller communicatively coupled to the image capturing system. A scanner body has a scanner opening. The image capturing system is located adjacent the scanner opening. An LCD document glass is adjacent to the scanner opening. The LCD document glass is communicatively coupled to the controller. The LCD document glass is controlled to be in a transparent state wherein the LCD document glass is clear and a translucent state wherein the LCD document glass is darkened.

19 Claims, 6 Drawing Sheets

IMAGING APPARATUS HAVING AN LCD DOCUMENT GLASS

CROSS REFERENCES TO RELATED APPLICATIONS

This application is related to application Ser. No. 12/006,203 entitled IMAGING APPARATUS HAVING A DOCUMENT PLANAR MEMBER THAT DISPLAYS SCAN OPERATION RELATED INDICIA, filed Dec. 31, 2007, and to application Ser. No. 12/006,202 entitled IMAGING APPARATUS HAVING A DOCUMENT PLANAR MEMBER WITH AN INPUT OPERATING STATE, filed Dec. 31, 2007.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to scanners and scanning methods, and more particularly to an imaging apparatus having a liquid crystal display (LCD) document glass.

2. Description of the Related Art

In prior art, an imaging apparatus in the form of a scanner is used to generate a digital representation of a document being scanned. Such a document may include any of a variety of media types, such as paper, card stock, etc., and may be regular (e.g., rectangular) or irregular in shape, and on which there is formed, for example, text, graphics or a picture, e.g., a photo, or a combination thereof. In one type of scanner, typically known in the art as a flat bed scanner, prior to scanning of a target document, the scanner lid is lifted and the target document is positioned on a document glass in the correct orientation and location. Thereafter, prior to scanning, the scanner lid is closed to prevent incident light around the edges of the target document from adversely affecting the quality of the scan.

SUMMARY OF THE INVENTION

The invention, in one form thereof, is directed to an imaging apparatus. The imaging apparatus includes an image capturing system, and a controller communicatively coupled to the image capturing system. A scanner body has a scanner opening. The image capturing system is located adjacent the scanner opening. A document planar member is adjacent to the scanner opening. The document planar member is communicatively coupled to the controller. The document planar member has a transparent state wherein the document planar member is clear and has a translucent state wherein the document planar member is darkened.

The invention, in another form thereof, is directed to a method for performing a scanning operation with a scanner unit that includes a document glass having a transparent state wherein the document glass is clear and having a translucent state wherein the document glass is translucent. The method includes performing a preliminary scan in which the document glass is controlled to operate in the translucent state during which time a boundary of the target document, appearing on the document glass, is determined; performing an image scan following the preliminary scan, wherein the document glass is controlled to operate in the transparent state in a region under the target document; and using the boundary of the target document determined during the preliminary scan to crop data retrieved during the image scan so as to retain only image data associated with the target document.

The invention, in another form thereof, is directed to a method for performing a scanning operation with a scanning unit that includes a clear document glass and an document planar member. The document planar member has a transparent state wherein the document planar member is clear and has a translucent state wherein the document planar member is darkened. The method includes positioning a target document to be scanned on the clear document glass; covering the target document with the document planar member; controlling the document planar member to operate in the translucent state; and scanning the target document.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and other alternative mechanical configurations are possible.

Figure 1:
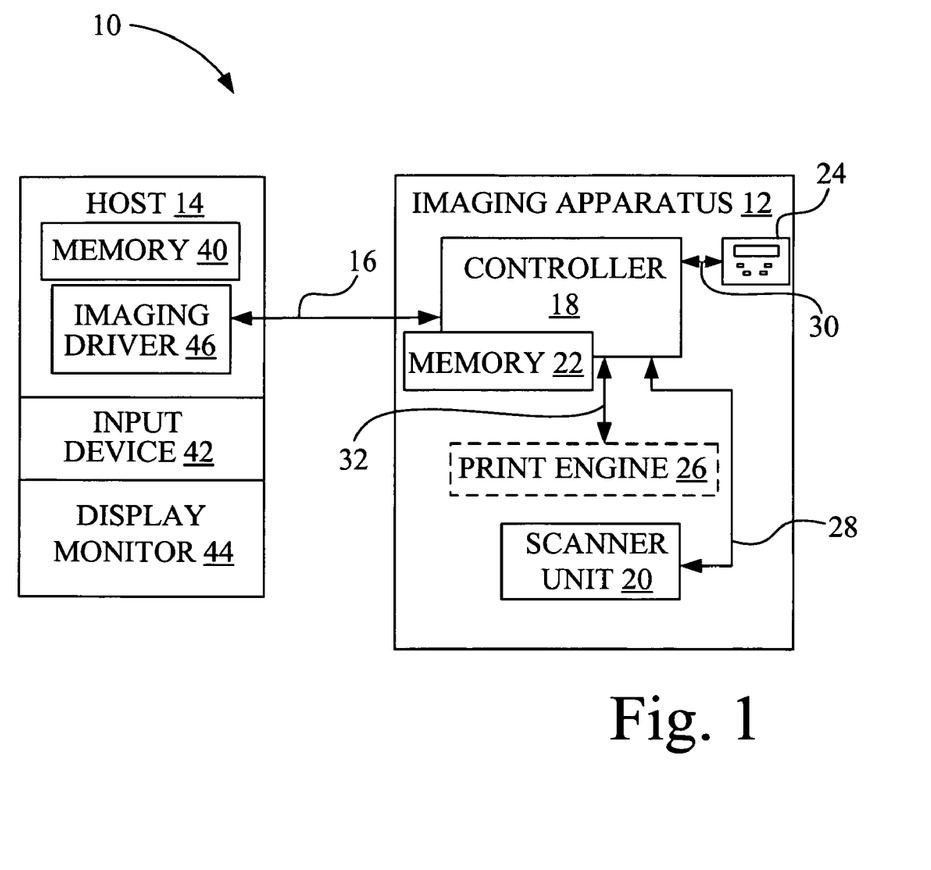
FIG. 1 is a diagrammatic depiction of an imaging system embodying the present invention.

Referring now to the drawings and particularly to FIG. 1, there is shown a diagrammatic depiction of an imaging system 10 embodying the present invention.

Imaging system 10 may include an imaging apparatus 12 and a host 14. Imaging apparatus 12 communicates with host 14 via a communications link 16. As used herein, the term "communications link" is used to generally refer to structure that facilitates electronic communication between multiple components, and may operate using wired or wireless technology. Imaging apparatus 12 may communicate with host 14 via a standard communication protocol, such as for example, universal serial bus (USB), Ethernet or IEEE 802.xx.

In the exemplary embodiment of FIG. 1, imaging apparatus 12 includes a controller 18, a scanner unit 20, memory 22, and a user interface 24. Optionally, as indicated by dashed lines, imaging apparatus 12 may also include a print engine 26 for performing a printing function. Print engine 26 may accommodate, for example, ink jet printing, electrophotographic printing, thermal transfer printing, etc. Thus, in the context of the present invention, it is to be understood that imaging apparatus 12 may be a scanner, a scanner-copier, a scanner-printer-copier, and may include other functionality, such as facsimile capability to form an All-In-One (AIO) machine.

Controller 18 includes a processor unit and associated memory 22, and may be formed as one or more Application Specific Integrated Circuits (ASIC). Memory 22 may be, for example, random access memory (RAM), read only memory (ROM), and/or non-volatile RAM (NVRAM). Alternatively, memory 22 may be in the form of a separate electronic memory (e.g., RAM, ROM, and/or NVRAM), a hard drive, a CD or DVD drive, or any memory device convenient for use with controller 18. Controller 18 is a scanner controller, and in some embodiments may be a combined printer and scanner controller.

In the present embodiment, controller 18 communicates with scanner unit 20 via a communications link 28. User interface 24 is communicatively coupled to controller 18 via a communications link 30. Optional print engine 26 is communicatively coupled to controller 18 via a communications link 32. Controller 18 serves to operate scanner unit 20 and process data obtained via scanner unit 20. In addition, optionally, controller 18 executes program instructions to process print data and to operate print engine 26 during printing.

Host 14, which may be optional, may be, for example, a personal computer, including memory 40, such as RAM, ROM, and/or NVRAM, an input device 42, such as a keyboard, and a display monitor 44. Host 14 further includes a processor, input/output (I/O) interfaces, and at least one mass data storage device, such as a hard drive, a CD-ROM and/or a DVD unit.

Host 14 may include in its memory a software program including program instructions that function as an imaging driver 46, e.g., scanner and/or printer driver software, for imaging apparatus 12. Imaging driver 46 is in communication with controller 18 of imaging apparatus 12 via communications link 16. Imaging driver 46 facilitates communication between imaging apparatus 12 and host 14.

In some circumstances, it may be desirable to operate imaging apparatus 12 in a standalone mode. In the standalone mode, imaging apparatus 12 is capable of functioning without host 14. Accordingly, all or a portion of imaging driver 46, or a similar driver, may be located in controller 18 of imaging apparatus 12 so as to accommodate scanning, copying, and/or printing operations being handled by imaging apparatus 12 when operating in the standalone mode.

Figure 2:
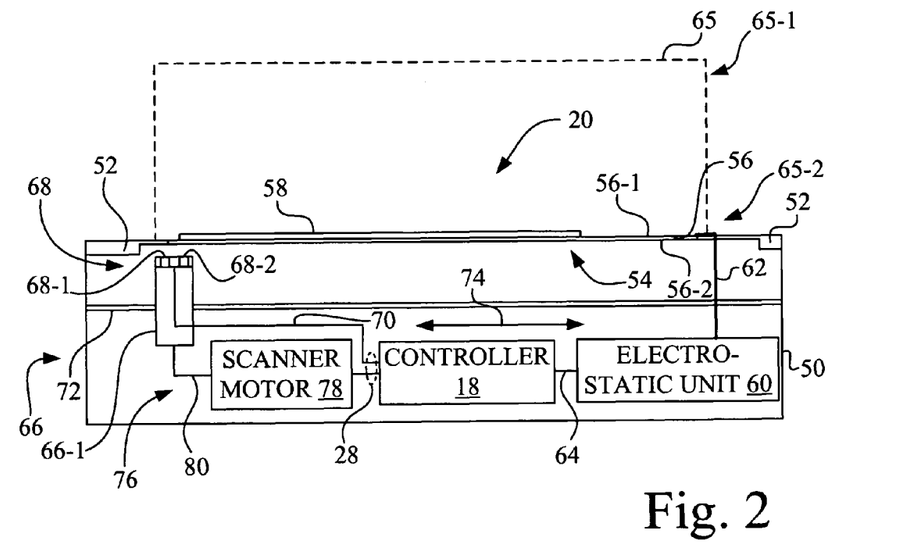
FIG. 2 is a diagrammatic representation of an embodiment of the scanner unit used in the imaging system of FIG. 1, that includes an LCD document glass.

Referring to FIG. 2, there is shown an embodiment of the present invention where scanner unit 20 is a flat bed scanner. Scanner unit 20 includes a scanner body 50. Noticeably absent from the present embodiment is the presence of a scanner lid.

Scanner body 50 has a cover 52 that defines a scanner opening 54. In accordance with the present embodiment of the present invention, a liquid crystal display (LCD) document glass 56 is mounted across, i.e., is adjacent to, scanner opening 54. LCD document glass 56 includes an upper surface 56-1 for supporting a target document 58 in the present embodiment, and a back surface 56-2. The target document 58 to be scanned is positioned face-down on upper surface 56-1 of LCD document glass 56 and is supported thereby. LCD document glass 56 is not limited to a glass material, and may be formed from other materials, such as plastic, that forms a planar member on which target document 58 is supported.

Optionally, an electrostatic unit 60 is coupled by a conductor device 62 to LCD document glass 56 to controllably supply a static charge to upper surface 56-1 of LCD document glass 56 so as to hold target document 58 in position in contact with LCD document glass 56. In this regard, controller 18 is communicatively coupled to electrostatic unit 60 via communication link 64, and executes program instructions to activate electrostatic unit 60 to apply a static charge to LCD document glass 56 to hold target document 58 in position in contact with LCD document glass 56.

As a further option, as illustrated by phantom lines in FIG. 2, a clear glass scanner lid 65 may be pivotably connected to scanner body 50 and configured to be moved between an open position 65-1 and a closed position 65-2. When in closed position 65-2, glass scanner lid 65 covers LCD document glass 56. Thus, clear glass scanner lid 65 may be closed to provide protection to LCD document glass 56 from contaminants, such as dust, and may also be imaged through if desired while in closed position 65-2. Further, glass scanner lid 65 may be used to hold target document 58 in the desired position on LCD document glass 56, if desired. The clear glass scanner lid 65 is not limited to a glass material, and may be formed from other materials, such as plastic, and be clear or translucent.

An image capturing system 66 is located adjacent, e.g., below, the cover 52 of scanner body 50, and more particularly is positioned to directly face back surface 56-2 of LCD document glass 56. In the present embodiment, image capturing system 66 includes a scan bar 66-1 that mounts an image capturing device 68. In the present embodiment, image capturing device 68 is a scanner head 68, although image capturing device 68 may take other forms, such as that of a digital camera. In the present embodiment, scanner head 68 includes a light source 68-1 and an image sensor 68-2. Image capturing system 66 including image capturing device 68, e.g., scanner head 68, is communicatively coupled to controller 18 via communication link 70.

Alternatively, it is contemplated that image capturing system 66 may be configured with image capturing device 68 mounted to be stationary, and formed from a camera/lens arrangement that does not require the use of scan bar 66-1 and the associated drive mechanism for moving scan bar 66-1.

In some embodiments, scan bar 66-1 mounting scanner head 68 is generally either an optical reduction type using a combination of lens, mirror and a CCD (Charge Coupled Device) array or CIS (Contact Image Sensors) array. The CCD array is a collection of tiny, light-sensitive diodes, which convert photons into electrons. These diodes are called photosites—the brighter the light that hits a single photosite, the greater the electrical charge that will accumulate at that site. The image of the document that is scanned using a light source such as a fluorescent bulb reaches the CCD array through a series of mirrors, filters and lenses. The exact configuration of these components will depend on the model of scanner. Some optical reduction scanners use a three pass scanning method. Each pass uses a different color filter (red, green or blue) between the lens and CCD array. After the three passes are completed, the scanner software assembles the three filtered images into a single full-color image. Most optical reduction scanners use the single pass method. The lens splits the image into three smaller versions of the original. Each smaller version passes through a color filter (either red, green or blue) onto a discrete section of the CCD array. The scanner software combines the data from the three parts of the CCD array into a single full-color image.

In general, for inexpensive flatbed scanners contact image sensors (CIS) are used in the scan bar 66-1. CIS arrays replaces the CCD array, mirrors, filters, lamp and lens with an array of red, green and blue light emitting diodes (LEDs) and a corresponding array of phototransistors. The image sensor array may consist, for example, of 600, 1200, 2400 or 4800 LEDs and phototransistors per inch (depending on resolution), for each of one or more color planes, that spans the width of the scan area and is placed very close to the glass plate upon which rest the image to be scanned. Another version of the CIS uses a single set of red, green and blue LEDS in combination with light pipes to provide illumination of the material to be scanned. When the image is scanned, the LEDs combine to provide a white light source. The illuminated image is then captured by the row of sensors. CIS scanners are cheaper, lighter and thinner, but may not provide the same level of quality and resolution found in most optical reduction scanners. Color scanning is done by illuminating each color type of LED separately and then combining the three scans.

Scan bar 66-1 is slidably coupled to a longitudinal guide member 72 for movement along bi-directional scan directions 74. As schematically illustrated in FIG. 2, scan bar 66-1 is drivably coupled to a drive mechanism 76, including a scanner motor 78 and a drive train 80, to effect a scanning movement of scan bar 66-1, and in turn scanner head 68, along guide member 72. The scanning movement may be, for example, from a top of page position at one end of LCD document glass 56 to a bottom of page position at an opposite end of LCD document glass 56, or vice versa.

Drive mechanism 76 is communicatively coupled, e.g., by an electrical cable, to controller 18, with controller 18 providing signals to drive mechanism 76 to effect a scanning operation, e.g., either of a preliminary scan operation or an image scan operation. Drive train 80 of drive mechanism 76 may include, for example, belts, pulleys, gears, etc. that are coupled to scanner motor 78 for effecting the scanning movement of scan bar 66-1.

Figure 3:
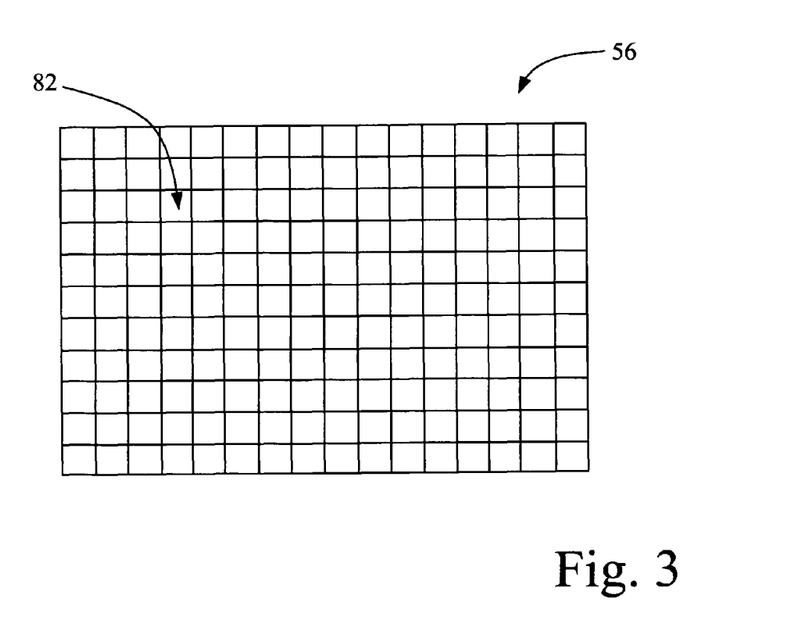
FIG. 3 is a diagrammatic representation of a top view of the LCD document glass of FIG. 2.

In accordance with the present embodiment, and referring to FIG. 3, LCD document glass 56 is formed as a planar substrate having essentially its entire planar area covered with a plurality of LCD elements 82, schematically illustrated as a matrix of rectangles. LCD document glass 56 has a transparent state, such as for example wherein when de-energized LCD document glass 56 is clear, and has a translucent state, such as for example, when energized, e.g., by controller 18, all or a selected portion of the LCD elements 82 are activated such that LCD document glass 56 is darkened. Those skilled in the art will recognize the configuration of LCD document glass 56 will determine the state resulting from energizing, and the state resulting from de-energizing, the plurality of LCD elements 82 of LCD document glass 56.

As used herein, the term "transparent state" is an operating state that has the property of transmitting light without appreciable scattering, i.e., is clear. The term "translucent state" is an operating state that has the property of transmitting and diffusing light with appreciable light scattering such that the planar surface is darkened, i.e., is not clear.

Those skilled in the art will recognize that the level of darkness associated with the translucent state may be predetermined to be a fixed value, or may be variable whereby providing multiple selectable levels of darkness.

In addition, controller 18 may control LCD document glass 56 to operate in a display mode as an LCD display screen to display information by selectively activating one or more of the plurality of LCD elements 82 of LCD document glass 56. In this regard, LCD document glass 56 may form part of user interface 24 or a monitor in communication with host 14.

Figure 4:
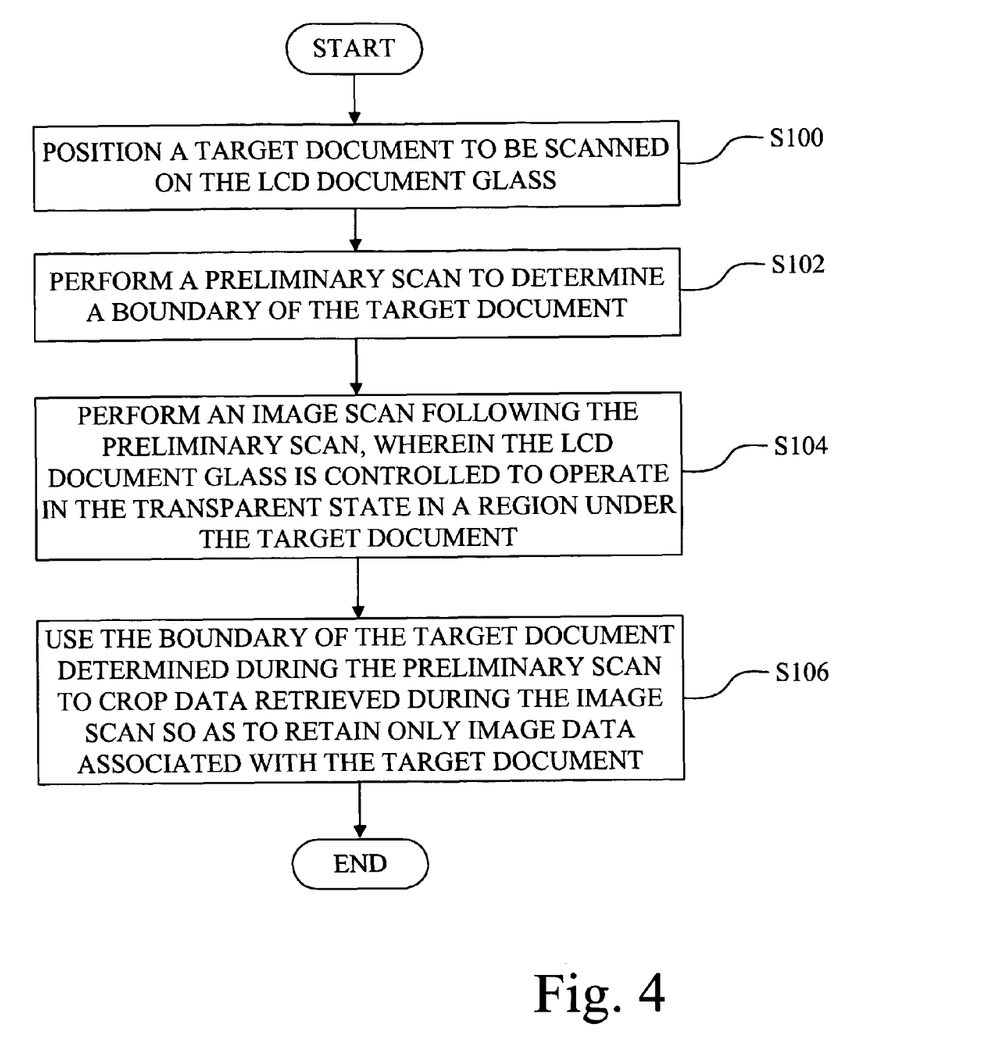
FIG. 4 is a flowchart of a method for scanning, in accordance with the embodiment of FIG. 2.

FIG. 4 is a flowchart of a method for scanning, in accordance with the embodiment of FIG. 2. Each of the control aspects of the method may be performed, for example, as program instructions executed by controller 18.

At act S100, a target document, e.g., target document 58, to be scanned is positioned on LCD document glass 56. This act may be performed, for example, manually by a user. Optionally, to retain target document 58 in its current position on LCD document glass 56, controller 18 may execute program instructions to active electrostatic unit 60 to apply a static charge to LCD document glass 56.

At act S102, a preliminary scan is performed to determine a boundary of target document 58. For example, controller 18 may execute program instructions to operate LCD document glass 56 in the translucent state. In some embodiments, controller 18 further executes program instructions to initiate a scan of scan bar 66-1 carrying image capturing device 68 over the back surface 56-2 of LCD document glass 56. Due to the translucent (darkened) state of LCD document glass 56, target document 58 will be seen by image capturing device 68 as a dark shadow (i.e., darker) than LCD document glass 56. The data obtained during the preliminary scan is analyzed, e.g., through a comparison algorithm executed by controller 18, to determine the boundary of target document 58 based on the contrast of the dark shadow of the target document and the darkness of the LCD document glass.

Alternatively, controller 18 may execute program instructions to operate LCD document glass 56 in the transparent state. In some embodiments, controller 18 further executes program instructions to initiate a scan of scan bar 66-1 carrying image capturing device 68 over the back surface 56-2 of LCD document glass 56. Due to the reflective contrast between target document 58 and the region surrounding target document 58, a dark band will be seen by image capturing device 68 around target document 58. The data obtained during the preliminary scan is analyzed, e.g., through a comparison algorithm executed by controller 18, to determine the boundary of target document 58 based on the contrast of the dark band around target document 58 and the surface of target document 58.

At act S104, an image scan is performed following the preliminary scan, wherein LCD document glass 56 is controlled to operate in the transparent state in a region under target document 58. For example, controller 18 may execute program instructions to operate LCD document glass 56 in the transparent state in a region under target document 58 (e.g., within the boundary of target document 58, as determined at act S102), wherein LCD document glass 56 is controlled to be clear in the region under target document 58, while operating LCD document glass 56 to be in a translucent (e.g., darkened) state in a region outside the boundary of target document 58. In some embodiments, controller 18 further executes program instructions to initiate a second scan of scan bar 66-1 carrying image capturing device 68 over the back surface 56-2 of LCD document glass 56. Due to the transparent (clear) state of LCD document glass 56 in the region under target document 58, the image content of target document 58 will be seen by image capturing device 68.

At act S106, the boundary of the target document determined during the preliminary scan is used to crop the data retrieved during the image scan so as to retain only image data associated with target document 58. For example, controller 18 may execute program instructions to delete any of the data retrieved during the image scan that lies outside the boundary of target document 58, as determined during the preliminary scan, thereby retaining only image data associated with target document 58. The image data associated with target document 58 may be further processed, as desired, or stored in a memory, such as memory 22 or memory 40.

Also, if desired, LCD document glass 56 may be controlled to be in the translucent state when imaging apparatus 12 is not in use, so as to obscure the contents inside scanner body 50, e.g., below LCD document glass 56, e.g., to hide internal components, such as scan bar 66-1.

Figure 5:
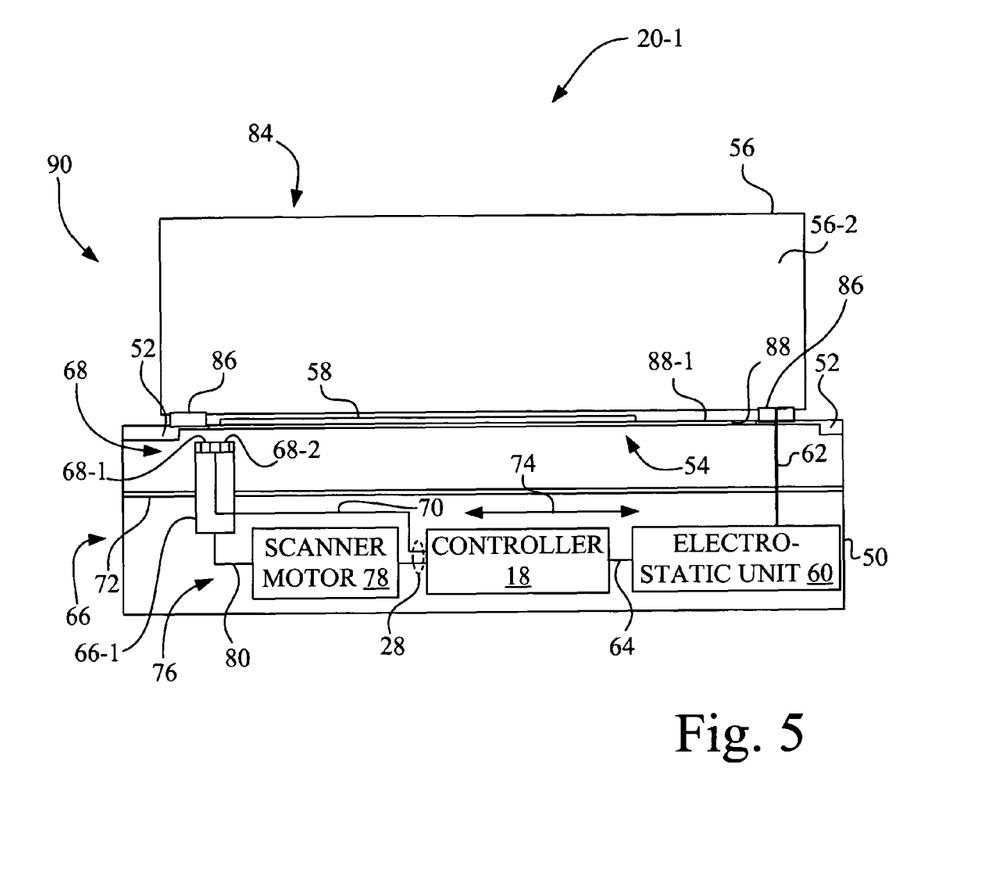
FIG. 5 is a diagrammatic representation of another embodiment of the scanner unit used in the imaging system of FIG. 1, with the scanner lid in the open position.

Referring to FIG. 5, there is shown another embodiment of the present invention where a scanner unit 20-1 is a flat bed scanner, and is a variant of the embodiment of FIG. 2. Scanner unit 20-1 includes a scanner body 50. Noticeably present in the embodiment of FIG. 5, in comparison to the embodiment of FIG. 2, is a scanner lid 84 pivotably coupled to scanner body 50 by a pair of hinges 86. Also, in the present embodiment, LCD document glass 56 is used to form scanner lid 84, and a clear document glass 88 is positioned across the scanner opening 54 in scanner body 50.

The embodiment of FIG. 5 is configured to be operable in either of two scan modes.

Figure 6:
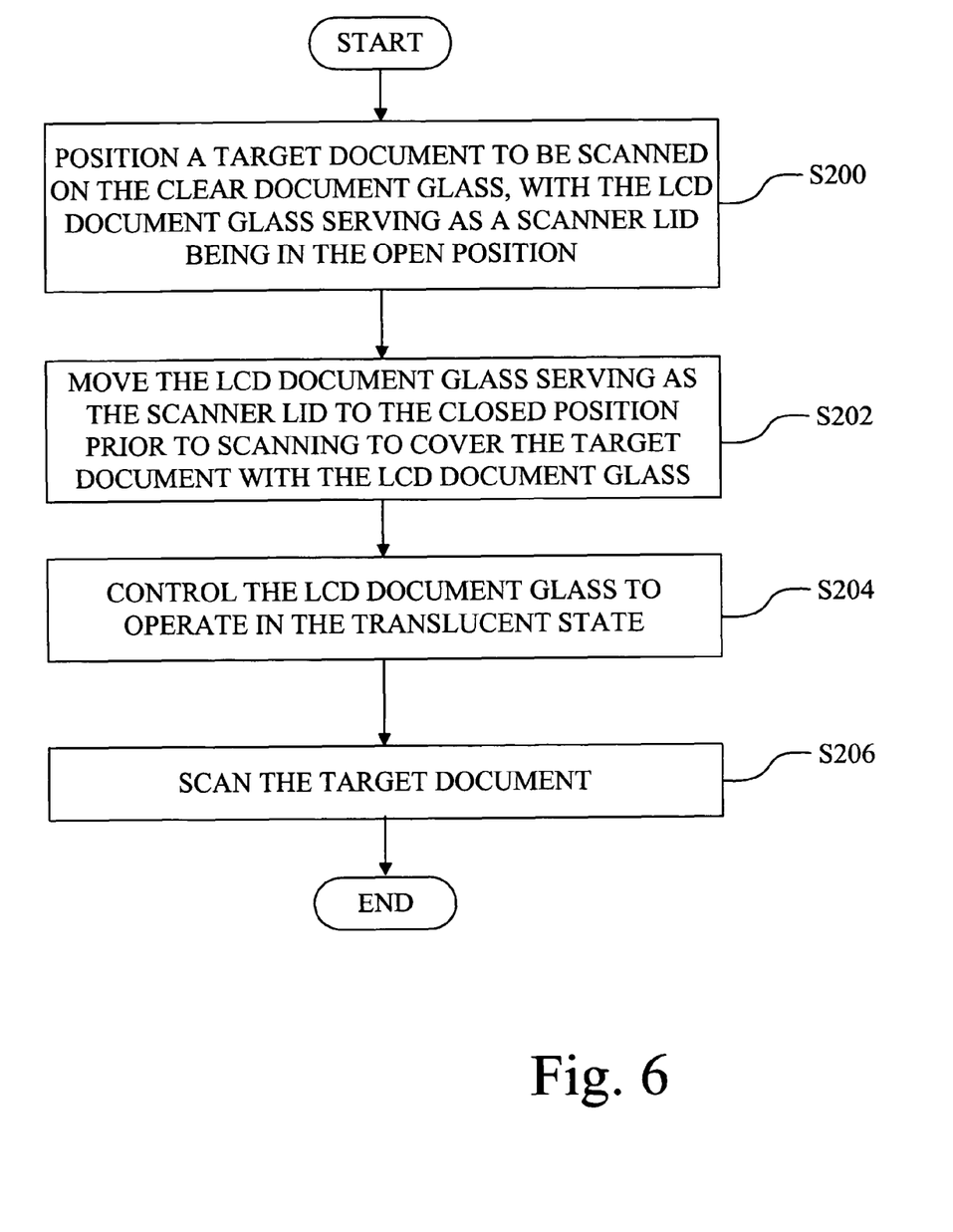
FIG. 6 is a flowchart of a method associated with a first scan mode of the embodiment of FIG. 5.

In the first scan mode, LCD document glass 56 is used as a scanner lid with target document 58 being supported by upper surface 88-1 of clear document glass 88, as shown in FIG. 5. FIG. 6 is a flowchart of a method associated with the first scan mode of the embodiment of FIG. 5.

At act S200, a target document, e.g., target document 58, to be scanned is positioned on an upper surface 88-1 of clear document glass 88, with LCD document glass 56 serving as scanner lid 84 being in the open position 90, as illustrated in FIG. 5.

Figure 7:
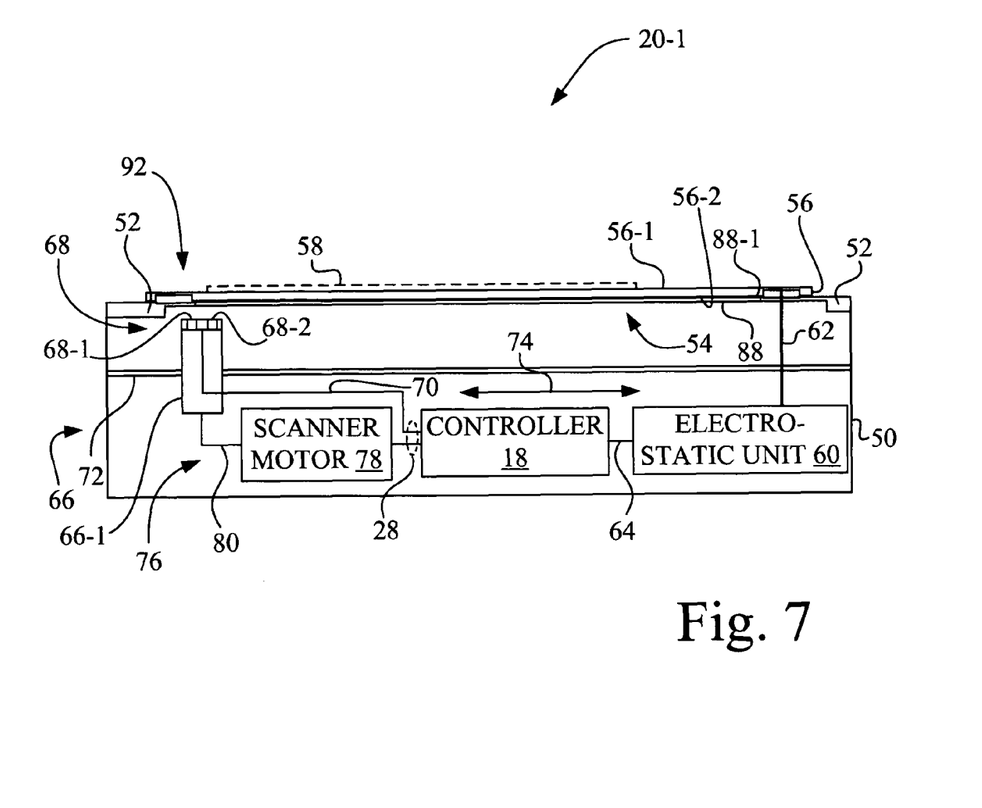
FIG. 7 is a diagrammatic representation of the embodiment of the scanner unit of FIG. 5, with the scanner lid in the closed position.

At act S202, LCD document glass 56, serving as scanner lid 84, is moved to the closed position 92 prior to scanning to cover target document 58 with LCD document glass 56, as illustrated in FIG. 7. When in closed position 92 in act S202, LCD document glass 56 is adjacent to target document 58, clear document glass 88 and scanner opening 54.

At act S204, LCD document glass 56 is controlled to operate in the translucent state. For example, controller 18 may execute program instructions to control LCD document glass 56 to operate in the translucent, i.e., darkened, state, such that LCD document glass 56 functions similar to a traditional solid scanner lid.

At act S206, target document 58 is scanned. For example, controller 18 may execute program instructions to control scanner unit 20-1 to perform a scan of target document 58. The image data associated with target document 58 may be further processed, as desired, or stored in a memory, such as memory 22 or memory 40.

In the second scan mode, LCD document glass 56 is not used as a scanner lid, but rather, is used as a document support similar to that disclosed above with respect to the embodiment of FIG. 2. In other words, when operating in the second scan mode, LCD document glass 56 is in the closed position 92, as illustrated in FIG. 7, and back surface 56-2 of LCD document glass 56 is positioned adjacent to upper surface 88-1 of clear document glass 88 and scanner opening 54. In the second scan mode, target document 58 (shown in dashed lines) is supported by upper surface 56-1 of LCD document glass 56, similar to that in the embodiment of FIG. 2.

The method for performing a scanning operation in the second scan mode (see FIG. 7) for the embodiment of FIG. 5 is the same as that of the embodiment described above with respect to FIG. 2, and thus the method depicted in the flowchart of FIG. 4 may also be used in the second scan mode of the present embodiment. As to the hardware configuration when operating in the second scan mode, the primary difference between the embodiment of FIG. 2 and the embodiment shown in FIG. 7 is the presence of clear document glass 88 between image capturing device 68 and LCD document glass 56.

The foregoing description of several methods and embodiments of the invention have been presented for purposes of illustration. It is not intended to be exhaustive or to limit the invention to the precise acts and/or forms disclosed, and obviously many modifications and variations are possible in light of the above teaching. For example, it is understood that document glass 56 may utilize a technology other than LCD technology, in which individual elements or groups of elements may be controlled to be in a transparent state and at least one translucent state. It is intended that the scope of the invention be defined by the claims appended hereto.

What is claimed is:

1. An imaging apparatus, comprising:
an image capturing system;
a controller communicatively coupled to said image capturing system;
a scanner body having a scanner opening, said image capturing system being located adjacent said scanner opening; and
a document planar member adjacent to said scanner opening, said document planar member being communicatively coupled to said controller, said document planar member having a transparent state wherein said document planar member is clear and having a translucent state wherein said document planar member is translucent, said document planar member being mounted to said scanner body and positioned across said scanner opening, said document planar member having a first surface for supporting said target document to be scanned;
wherein during a scanning operation, a preliminary scan is performed wherein said controller executes program instructions to control said image capturing system to determine a boundary of said target document in a preliminary scan during a scanning operation.

2. The imaging apparatus of claim 1, wherein during said preliminary scan of said scanning operation, said controller executes program instructions to control said document planar member to operate in said translucent state, and controls said image capturing system to determine said boundary of said target document while said document planar member is in said translucent state.

3. The imaging apparatus of claim 1, wherein during said scanning operation, an image scan is performed following said preliminary scan, wherein said controller executes program instructions to control said document planar member to operate in said transparent state in a region under said target document, and to control said image capturing system to scan said target document while said document planar member is in said transparent state in said region under said target document.

4. The imaging apparatus of claim 3, wherein said controller uses said boundary of said target document determined during said preliminary scan to crop data retrieved during said image scan so as to retain only image data associated with said target document.

5. The imaging apparatus of claim 1, further comprising an electrostatic unit coupled to said document planar member, and communicatively coupled to said controller, said controller executing program instructions to activate said electrostatic unit to apply a static charge to said document planar member to hold said target document in position in contact with said document planar member.

6. The imaging apparatus of claim 1, further comprising a scanner lid that is pivotably coupled to said scanner body and movable between an open position and a closed position, wherein when in said closed position covers said document planar member.

7. The imaging apparatus of claim 1, wherein said controller executes program instructions to control said document planar member to operate in a display mode as a display screen to display information.

8. The imaging apparatus of claim 1, wherein said document planar member is pivotably coupled to said scanner body and movable between an open position and a closed position, and further comprising a clear document planar member positioned across said scanner opening.

9. The imaging apparatus of claim 8, wherein said controller executes program instructions to control said document planar member to operate in a display mode as a display screen to display information.

10. The imagine apparatus of claim 1, wherein said document planar member comprises a plurality of LCD elements.

11. The imaging apparatus of claim 1, wherein said document planar member comprises a document glass member.

12. An imaging apparatus, comprising:
an image capturing system;
a controller communicatively coupled to said image capturing system;
a scanner body having a scanner opening, said image capturing system being located adjacent said scanner opening; and
a document planar member adjacent to said scanner opening, said document planar member being communicatively coupled to said controller, said document planar member having a transparent state wherein said document planar member is clear and having a translucent state wherein said document planar member is translucent, wherein said document planar member is pivotably coupled to said scanner body and movable between an open position and a closed position, and further comprising a clear document planar member positioned across said scanner opening;
wherein when operating in a first scan mode, said document planar member is used as a document lid with a target document being supported by said clear document planar member, and prior to scanning said target document said document planar member is placed in said closed position to cover over said target document, and said controller executes program instructions to control said document planar member to operate in said translucent state.

13. An imaging apparatus, comprising:
an image capturing system;
a controller communicatively coupled to said image capturing system;
a scanner body having a scanner opening, said image capturing system being located adjacent said scanner opening; and
a document planar member adjacent to said scanner opening, said document planar member being communicatively coupled to said controller, said document planar member having a transparent state wherein said document planar member is clear and having a translucent state wherein said document planar member is translucent, wherein said document planar member is pivotably coupled to said scanner body and movable between an open position and a closed position, and further comprising a clear document planar member positioned across said scanner opening;
wherein when operating in a second scan mode, said document planar member is in said closed position and a target document is supported by said document planar member.

14. The imaging apparatus of claim 13, wherein during a scanning operation, a preliminary scan is performed wherein said controller executes program instructions to control said image capturing system to determine a boundary of said target document.

15. The imaging apparatus of claim 14, wherein during said scanning operation, an image scan is performed following said preliminary scan, wherein said controller executes program instructions to control said document planar member to operate in said transparent state in a region under said target document, and to control said image capturing system to scan said target document while said document planar member is in said transparent state in said region under said target document.

16. The imaging apparatus of claim 15, wherein said controller uses said boundary of said target document determined during said preliminary scan to crop data retrieved during said image scan so as to retain only image data associated with said target document.

17. A method for performing a scanning operation with a scanner unit that includes a clear document planar member, and a document planar member having a transparent state wherein said document planar member is clear and having a translucent state wherein said document planar member is translucent, comprising:
controlling said document planar member to operate in said translucent state; and
scanning said target document;
wherein said document planar member having said transparent and translucent states includes a plurality of LCD elements, and said controlling comprises de-energizing at least some of said LCD elements.

18. The method of claim 17, further comprising controlling said document planar member to operate in a display mode as a display screen to display information.

19. The method of claim 17, further comprising positioning, prior to said controlling, a target document between said clear document planar member and said document planar member having said transparent and translucent states.

* * * * *